United States Patent [19]

Naka

[11] 4,078,448
[45] Mar. 14, 1978

[54] FASTENING DEVICE FOR TILTABLE STEERING WHEEL ASSEMBLY

[75] Inventor: Mitsuru Naka, Toyota, Japan

[73] Assignee: Toyota Jidosha Kogyo Kabushiki Kaisha, Toyota, Japan

[21] Appl. No.: 702,293

[22] Filed: Jul. 2, 1976

[30] Foreign Application Priority Data

Dec. 25, 1975  Japan .................................. 50-157407

[51] Int. Cl.² .......................... B62D 1/18; G05G 5/18
[52] U.S. Cl. ...................................... 74/493; 74/530; 74/535; 74/536; 74/540
[58] Field of Search ................. 74/493, 530, 533, 534, 74/535, 536, 541, 540

[56] References Cited

U.S. PATENT DOCUMENTS

| 2,228,569 | 1/1941 | Johnson | 74/530 |
| 2,397,981 | 4/1946 | Phelps | 74/530 |
| 3,267,766 | 8/1966 | Glover et al. | 74/493 |
| 3,299,466 | 1/1967 | Werner | 74/530 X |
| 3,799,569 | 3/1974 | Baker | 74/493 X |

Primary Examiner—Allan D. Herrmann
Attorney, Agent, or Firm—Stevens, Davis, Miller & Mosher

[57] ABSTRACT

In a fastening device for a tiltable steering wheel assembly, the locking lever of the device is set in the locked position beyond the rotary dead point of a rotary cam element pivoted on a fastening bolt so as to firmly hold the steering wheel at a desired angle with respect to the driver. The fastening device is provided with a rack element and a ratchet element to give click feeling to the driver in adjustment of the steering wheel.

11 Claims, 7 Drawing Figures

FASTENING DEVICE FOR TILTABLE STEERING WHEEL ASSEMBLY

BACKGROUND OF THE INVENTION

The present invention relates to a tiltable steering wheel assembly for a vehicle, and more particularly to a fastening device to adjust and hold the steering wheel at a desired angle with respect to the driver.

Heretofore, a fastening device for a tiltable steering wheel assembly has been proposed which comprises a pair of fitting brackets respectively mounted on the vehicle body structure and a steering column tube journalling a steering shaft therein and a locking lever assembly for fastening the fitting brackets to each other to hold a steering wheel at a selected angle.

SUMMARY OF THE INVENTION

The present invention is directed to improve the above-mentioned type fastening device and to provide an improved fastening device to ensure the relative fastening of the fitting brackets and to give click feeling to the driver in adjusting the tilting angle of the steering wheel.

In accordance with the present invention, there is provided a fastening device which comprises a first bracket mounted on a portion of the vehicle body structure and having a pair of opposing arms; a second bracket secured to a tiltable steering column and having a pair of opposing arms coupled and pivoted to the pair of arms of the first bracket to hold the steering column tube at a desired angle; a fastening bolt extending transversely across the coupled portions of the first and second brackets; a lock nut fixed on one end of the bolt at one side of the coupled portions of the first and second brackets; a pressure plate slidably mounted on the other end of the bolt at the other side of the coupled portions of the first and second brackets; and a locking lever pivoted on the other end of the bolt and including a cam element to be engaged with the pressure plate in the locked position to fasten the first and second brackets to each other between the lock nut and the pressure plate. The fastening device further comprises a rack element integrally provided on the first or second bracket and including sloping teeth; a ratchet element pivoted on the second or first bracket to be engaged with the sloping teeth of the rack element; a resilient means for engaging the ratchet element with the sloping teeth of the rack element; a hook element integrally provided on the locking lever to be engaged with the ratchet element in the locked position; whereby when the locking lever is released, the hook element disengages from the ratchet element to cause swinging movement of the ratchet element on the sloping teeth of the rack element in adjustment of the second bracket.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
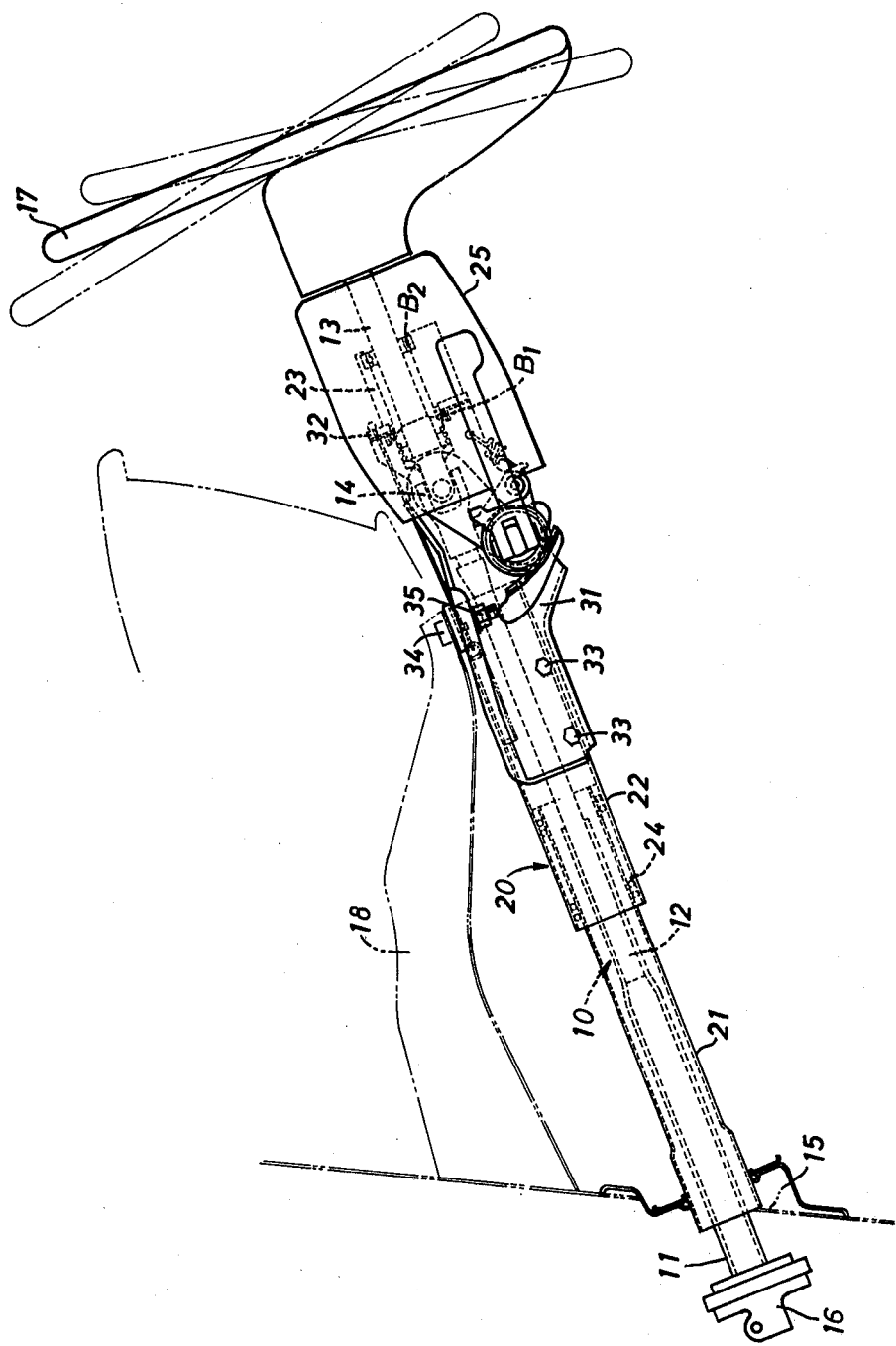
FIG. 1 is a side view of a preferred embodiment of a tiltable steering wheel assembly in accordance with the present invention.

Referring now to the accompanied drawings, particularly to FIG. 1, a steering shaft 10 comprises a tubular lower shaft 11, a middle shaft 12 axially slidably connected to the lower shaft 11, and an upper shaft 13 tiltably connected to the middle shaft 12 through a universal joint 14. The lower shaft 11 extends outward through a toe board 15 of the vehicle compartment and is connected at its lower end to a steering gear means (not shown) through a flexible coupling 16. The upper portion of the lower shaft 11 has an approximate rectangular cross-section and is connected to the lower portion of the middle shaft 12 in an axially slidable and torque transmissible way. A steering wheel 17 is mounted on the upper end of the upper shaft 13.

A column tube assembly 20 comprises a first tubular housing 21, a second tubular housing 22 surrounding the upper portion of the first tubular housing 21, and a third tubular housing 23 tiltably connected to the second tubular housing 22 by way of first and second fitting brackets 31 and 32. The first tubular housing 21 is anchored at its lower end to the toe board 15 and coupled at its upper portion with the second tubular housing 22 through a ball-type impact energy absorbing means 24. The second tubular housing 22 is mounted on a stationary bracket 18 by way of the first fitting bracket 31 which is secured on the upper outer periphery of the second tubular housing 22 by fastening bolts 33. The third tubular housing 23 is securely connected to the body portion of the second fitting bracket 32 which is pivoted to the first fitting bracket 31. Within the third tubular housing 23, the upper steering shaft 13 is rotatably supported by way of a pair of bearings $B_1$ and $B_2$. A breakable column cover 25 is mounted over the third tubular housing 23.

Figure 4:
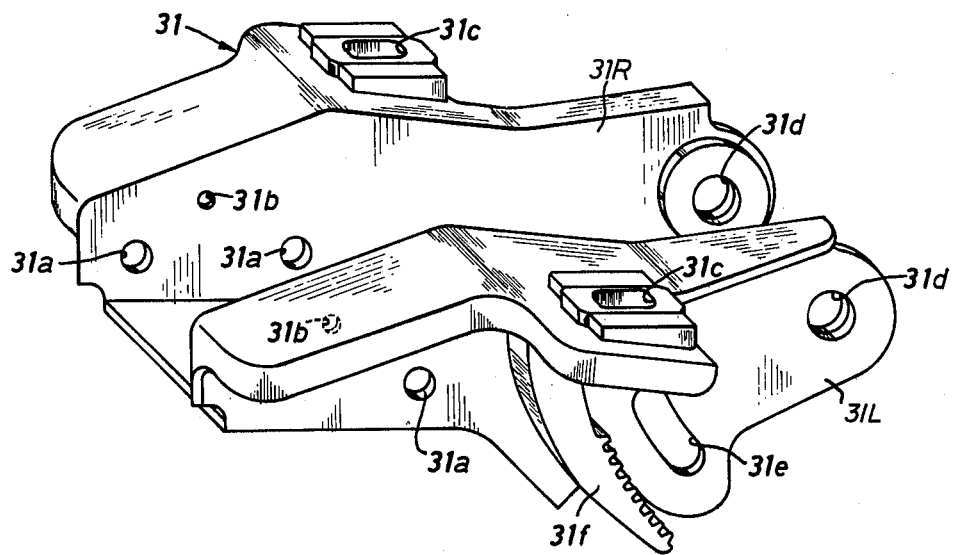
FIG. 4 is an enlarged perspective view of a first bracket shown in FIGS. 2 and 3.

As best illustrated in FIG. 4, the first fitting bracket 31 includes a U-shaped body portion and a pair of arms 31R and 31L extending from the body portion. Drilled through the both side walls of the body portion are four mounting holes 31a—31a and a pair of spring receiver holes 31b and provided on the flanges of the body portion are a pair of mounting holes 31c. The arms 31R and 31L have a pair of pivot holes 31d drilled therethrough correspondingly to each other. Provided also on the arms 31R and 31L are a pair of part circumferentially extending slots 31e which are defined about centers located at the pivot holes 31d. A part circumferentially extending rack member 31f is integrally provided on the side wall of the body portion in a position to be defined about a center located at the pivot hole 31d. Thus, the first fitting bracket 31 constructed as above is mounted on the stationary bracket 18 at the mounting portions 31c by way of bolts 34 and nuts 35 and supports the upper portion of the second tubular housing 22 by way of the fastening bolts 33 engaged in the mounting holes 31a, as shown in FIG. 1.

Figure 5:
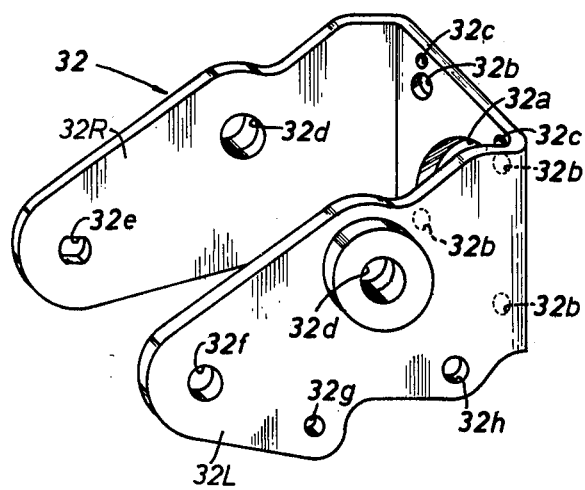
FIG. 5 is an enlarged perspective view of a second bracket shown in FIGS. 2 and 3.

As best shown in FIG. 5, the second fitting bracket 32 is formed in a U-shape. Provided on the body portion of the second fitting bracket 32 are a through hole 32a to support the upper steering shaft 13, four mounting holes 32b and a pair of spring receiver holes 32c. A pair of arms 32R and 32L of the second fitting bracket 32 have a pair of pivot holes 32d and receiving holes 32e and 32f respectively to receive a fastening bolt 41 which will be discussed later. The left arm 32L is further provided with a ratchet mounting hole 32g and a second spring receiver hole 32h. As well seen in FIG. 5, the receiving hole 32e of the right arm 32R takes an approximate rectangular shape.

Figure 2:
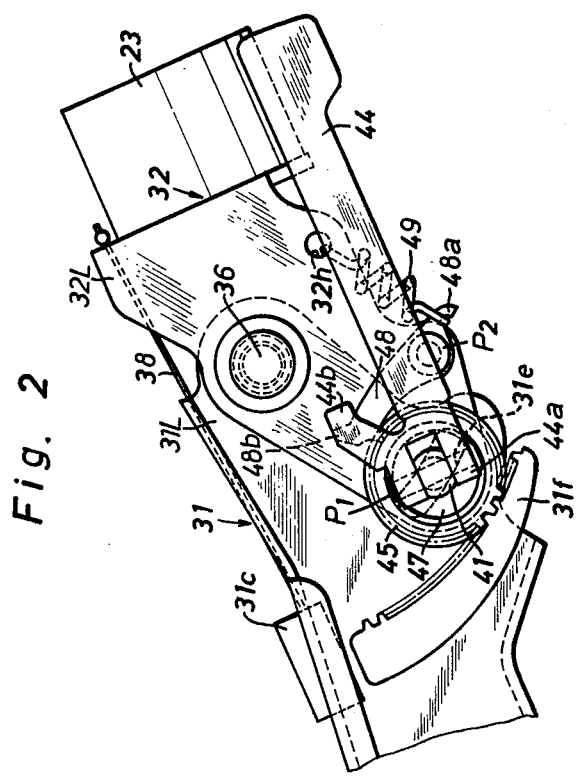
FIG. 2 is an enlarged side view of a portion of the tiltable steering wheel assembly shown in FIG. 1.
Figure 3:
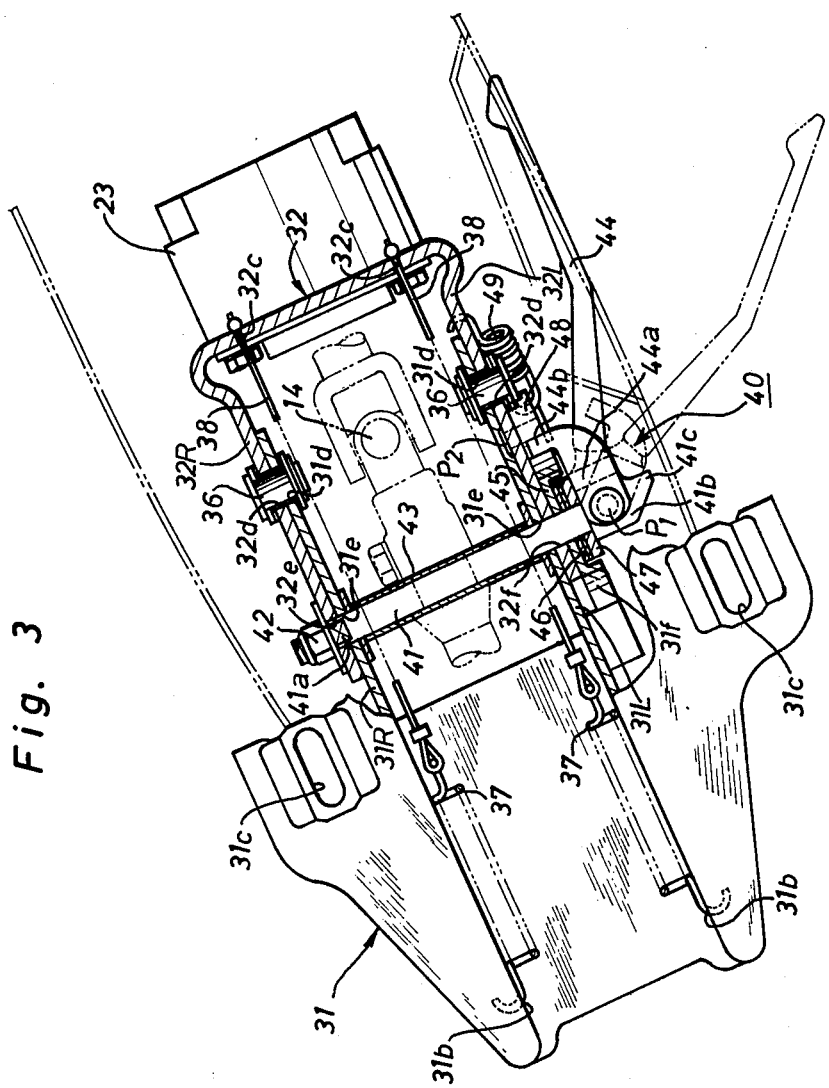
FIG. 3 is a partially broken and enlarged plan view of a portion of the tiltable steering wheel assembly shown in FIG. 1.

With reference to FIGS. 2 and 3, the second fitting bracket 32 is assembled with the first fitting bracket 31 in such a way as the arms 32R, 32L of the second fitting bracket overlap the arms 31R, 31L of the first fitting bracket 31. Thus, the arms 32R, 32L of the second fitting bracket 32 are pivoted to the arms 31R, 31L of the first fitting bracket 31 by way of lateral pivot pins 36 engaged with the pivot holes 31d and 32d. In this instance, each axis of the lateral pivot pins 36 corresponds to the connecting center of the universal joint 14. Between the body portions of the first and second fitting brackets 31 and 32, a pair of tension coil springs 37 is assembled to bias upward the second bracket 32 against the first bracket 31. The tension coil springs 37 are engaged at their one ends with the spring receiver holes 31b of the first bracket 31 and at their other ends with the spring receiver holes 32c of the second bracket 32 by way of steel wires 38.

To fasten the second movable fitting bracket 32 to the first stationary fitting bracket 31 in a desired angle, as shown in FIGS. 2 and 3, a fastening device 40 comprises the fastening bolt 41 transversely inserted into a sleeve 43 of the first bracket 31 through the slots 31e of the first bracket 31 and the receiving holes 32e and 32f of the second bracket 32. The fastening device 40 further comprises a lock nut 42 threaded on the right end of the bolt 41, a locking lever 44 pivoted on the left end of the bolt 41 by a pin $P_1$, a set of a pinion 45, dish springs 46 and a pressure plate 47 which are installed on the bolt 41 between the locking lever 44 and the left arm 32L of the second bracket 32, and a ratchet 48 pivoted by a pin $P_2$ fixed to the mounting hole 32g of the second bracket 32. The sleeve 43 is secured at its both ends to the arms 31R and 31L of the first bracket 31. As best shown in FIG. 3, the fastening bolt 41 includes a collar portion 41a engaged with the receiving hole 32e of the second bracket 32 to prevent rotation of the bolt 41, and a head portion 41b to pivot the locking lever 44 thereon. The head portion 41b of the bolt 41 is provided with a stopper 41c to restrict outward movement of the locking lever 44.

The locking lever 44 includes a cam portion 44a with a U-shaped cross-section and a hook portion 44b extending upward behind the cam portion 44a. This locking lever 44 is located in parallel with the steering column 20 in its locked position and in crossing relation with the steering column 20 in its unlocked position. The pinion 45 journalled on the bolt 41 is meshed with the rack member 31f of the first bracket 31. The ratchet 48 is located in a common plane with the pinion and engaged with the pinion 45 under counter-clockwise biasing force of a tension coil spring 49 which is stretched between the bottom hook 48a of the ratchet 48 and the second spring receiver hole 32h of the second bracket 32. This ratchet 48 is provided at its top end with an upward projection 48b to be engaged with the hook portion 44b of the locking lever 44. Thus, in clockwise or counter-clockwise rotation of the pinion 45, the ratchet 48 makes its swinging movement by the teeth of the pinion 45 and the resiliency of the spring 49. Meanwhile, while the locking lever 44 is positioned in its locked position, the swinging movement of the ratchet 48 is restricted by the hook portion 44b of the locking lever 44, as shown in FIG. 2.

Hereinafter, the function of the fastening device 40 will be described in detail. While the fastening device 40 is locked with the locking lever 44 placed in the position as shown with solid lines in FIG. 3, the pair of arms 31R, 31L of the first stationary bracket 31 are gripped by and held between the pair of arms 32R, 32L of the second fitting bracket 32 by a predetermined resilient force produced on the dish springs 46, which are compressed by the flat locking surface of the cam portion 44a of the locking lever 44. In this locked condition, the ratchet 48 pivoted at $P_2$ on the second bracket 32 engages with the hook portion 44b of the locking lever 44 to prevent rotation of the pinion 45 which is meshed with the teeth of the rack member 31f of the first fitting bracket 31. Thus, the upper steering shaft 13 supported by the third tubular housing 23, which is securedly mounted on the second bracket 32, is firmly held at a selected angle to hold the steering wheel 17 at a desired angle with respect to the driver.

When it is desired to adjust the angle of the steering wheel 17 with respect to the driver, the locking lever 44 is rotated forward over its rotary dead point to the unlocked position shown with solid and dot lines in FIG. 3 or the unlocked position the locking lever 44 engages the stopper 41c of the fastening bolt 41. This reduces the resilient force of the dish springs 46 and disengages the hook portion 44b of the locking lever 44 from the upward projection 48b of the ratchet 48, thereby to release the fastening device 40. In this instance, the tension springs 37 will move upward the second fitting bracket 32 and the third tubular housing 23 around the pivot pins 36 and the pinion 45 rotates counter-clockwise on the teeth of the rack member 31f of the first fitting bracket 31. The upward movement of the second fitting bracket 32 is limited by engagement of fastening bolt 41 against the lower edges of the slots 31e of the first bracket 31. Thus, the steering wheel 17 can freely be tilted downward by a desired amount, then the upper steering shaft 13 is correspondingly tilted with its rotation center at the universal joint 14 and the second fitting bracket 32 is also rotated downward with its rotation axis at the pivots 36. During the downward movement of the second fitting bracket 32, the pinion 45 rotates clockwise on the teeth of the rack member 31f of the first fitting bracket 31 and causes swinging movement of the ratchet 48 to give click feeling to the driver. Thereafter, when the locking lever 44 is moved back to the locked position parallel with respect to the column tube assembly 20 over its rotary dead point, the flat locking surface of the cam portion 44a of the lever 44 engages resiliently with the pressure plate 47 to lock the fastening device 40 and the hook portion 44b of the lever 44 engages with the ratchet 48 so that the steering wheel 17 is firmly held at the selected angle with respect to the driver.

Figure 6:
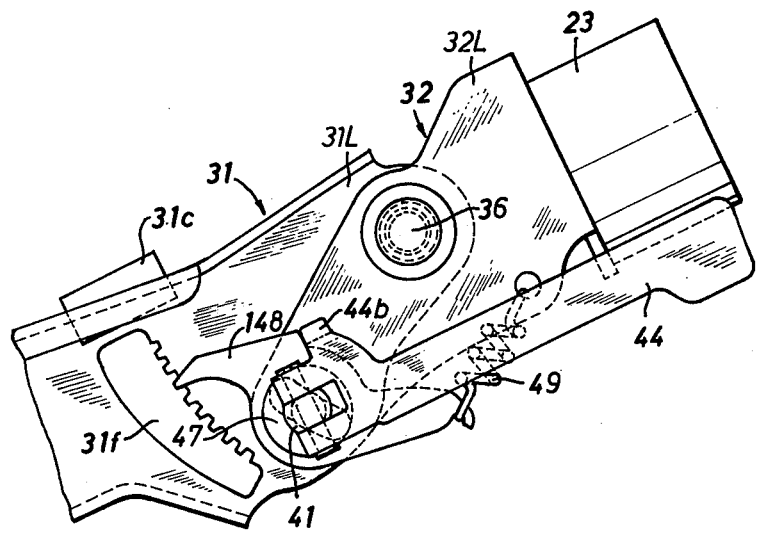
FIG. 6 is a side view of a modification of the present invention.

In FIG. 6, there is illustrated a modification of the present invention, wherein the same reference numerals and characters indicate the same component parts and portions as in the previous embodiment. In this modification, the pinion 45 and the ratchet 48 of the previous embodiment are replaced with a ratchet 148, which is journalled on the fastening bolt 41 and biased counter-clockwise by the tension coil spring 49. With this modification, when the steering wheel 17 is tilted downward by a desired amount under released condition of the fastening device 40, the ratchet 148 is released from the hook portion 44b of the locking lever 44 and swung by engagement to the teeth of the rack member 31f of the first fitting bracket 31 to give click feeling to the driver.

Figure 7:
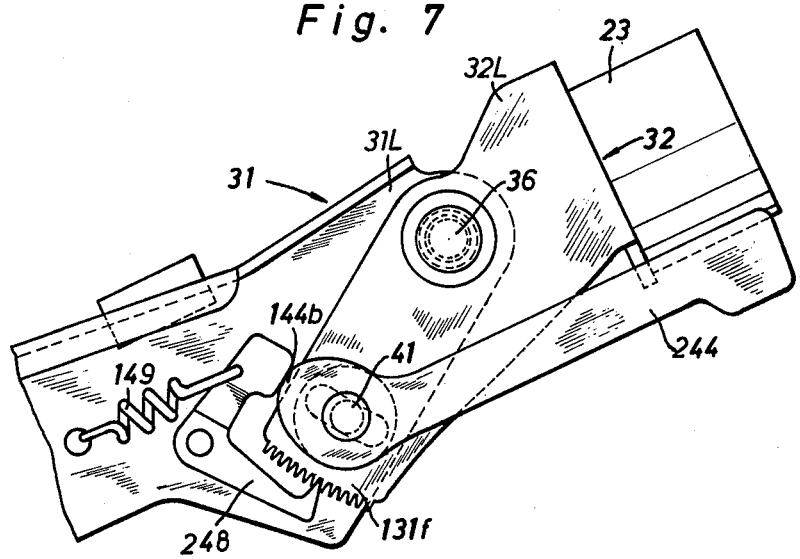
FIG. 7 is a side view of another modification of the present invention.

FIG. 7 illustrates another modification of the present invention, wherein a L-shaped ratchet 248 corresponds to the ratchet 48 of the previous embodiment and wherein teeth 131f provided on the left arm 32L of the second fitting bracket 32 corresponds to the teeth of the rack member 31f of the previous embodiment. The ratchet 248 is pivoted on the first fitting bracket 31 and biased counter-clockwise by a tension coil spring 149 one end of which is engaged with a portion of the first fitting bracket 31. In this modification, a locking lever 244 corresponding with the locking lever 44 of the previous embodiment is pivoted on the fastening bolt 41 to lock the fastening device 40 and rotated downward with respect to the column tube assembly to release the fastening device 40. Thus, the ratchet 248 engages with a curved cam face 144b of the locking lever 244 under the locked condition of the fastening device 40. With this modification, when the steering wheel 17 is tilted downward by a desired amount under released condition of the fastening device 40, the ratchet 248 is swung by engagement to the teeth 131f of the second fitting bracket 32 to give click feeling to the driver.

Although certain specific embodiments of the present invention have been shown and described, it is obvious that many modifications thereof are possible. The present invention, therefore, is not intended to be restricted to the exact showing of the drawings and description thereof, but is considered to include reasonable and obvious equivalents.

What is claimed is:

1. In a fastening device for a tiltable steering wheel assembly including a steering shaft tiltably connected to steering gear means, a column tube having said steering shaft journalled therein, and a steering wheel mounted on said steering shaft, comprising:
   a first bracket mounted on a portion of the vehicle body structure and having a pair of opposing arms;
   a second bracket secured to said column tube and having a pair of opposing arms coupled and pivoted to the pair of arms of said first bracket to hold said column tube at a desired angular position;
   a fastening bolt extending transversely across the coupled portions of said first and second brackets;
   a stopper means fixed on one end of said bolt at one side of the coupled portions of said first and second brackets;
   a pressure plate slidably mounted on the other end of said bolt at the other side of the coupled portions of said first and second brackets; and
   a locking lever pivoted on the other end of said bolt and including a cam element said cam element being arranged to compress said pressure plate against the coupled portions of said first and second brackets in the locked position;
   the improvement comprising;
   a rack element integrally provided on one of said first and second brackets;
   a ratchet element pivoted on the other of the first and second brackets and coupled to the rack element;
   a resilient element for biasing said ratchet element so as to cooperate with the rack element; and
   a lock element integrally provided on the locking lever and engagable with the ratchet element in the locked position such that when the locking lever is released, the lock element disengages from said ratchet element to cause pivoting movement of said ratchet element on the rack element on pivoting of the second bracket relative to the first bracket.

2. A fastening device as claimed in claim 1, wherein said ratchet element is journalled on said fastening bolt between the coupled portions of said first and second brackets and said pressure plate.

3. A fastening device for a tiltable steering wheel assembly as claimed in claim 1, wherein said locking lever is arranged to be located in parallel with the steering column in the locked position and in crossing relation to the steering column in the unlocked position.

4. A fastening device for a tiltable steering wheel assembly as claimed in claim 1, wherein said locking lever is pivoted on the other end of said bolt about an axis substantially perpendicular to the longitudinal axis of the bolt, and said cam element includes a curved cam surface for pressing said pressure plate toward said stopper means and a flat surface to be pressed against said pressure plate in the locked position.

5. A fastening device as claimed in claim 1 wherein said rack member has an arcuate shape.

6. A fastening device as claimed in claim 1, wherein said rack element is integrally provided on said second bracket and said ratchet element is pivoted on said first bracket to be engaged with the sloping teeth of said rack element.

7. A fastening device as claimed in claim 6 wherein said lock member comprises a curved cam surface integral with said locking lever.

8. A fastening device as claimed in claim 1, further comprising a pinion journalled on said fastening bolt between said pressure plate and the coupled portions of said first and second brackets and engaged with sloping teeth of said rack element, and wherein said ratchet element is pivoted on said second bracket and is engaged with said pinion to be swung by the teeth of said pinion in accordance with adjustment of said second bracket.

9. A fastening device for a tiltable steering wheel assembly as claimed in claim 8, further comprising a dish spring provided on said bolt between said pressure plate and said pinion.

10. A fastening device for a tiltable steering wheel assembly as claimed in claim 8, wherein said resilient member biases said ratchet element against said pinion.

11. A fastening device as claimed in claim 8 wherein said lock member is a hook which engages with and disengages from said ratchet member in accordance with movement of said locking lever.

* * * * *